US012294591B2

(12) United States Patent
Ezrielev et al.

(10) Patent No.: US 12,294,591 B2
(45) Date of Patent: May 6, 2025

(54) SYSTEM AND METHOD FOR DEVICE AUTHENTICATION IN A DISTRIBUTED ENVIRONMENT WITHOUT USER INTERVENTION

(71) Applicant: Dell Products L.P., Round Rock, TX (US)

(72) Inventors: Ofir Ezrielev, Be'er Sheva (IL); Jehuda Shemer, Kfar Saba (IL); Ronen Rabani, Kibuts Telalim (IL)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 18/187,969

(22) Filed: Mar. 22, 2023

(65) Prior Publication Data

US 2024/0323200 A1 Sep. 26, 2024

(51) Int. Cl.
*H04L 9/00* (2022.01)
*H04L 9/40* (2022.01)
(52) U.S. Cl.
CPC .......... *H04L 63/1416* (2013.01); *H04L 63/08* (2013.01); *H04L 63/1433* (2013.01)
(58) Field of Classification Search
CPC .. H04L 63/08; H04L 63/1416; H04L 63/1433
See application file for complete search history.

(56) References Cited

U.S. PATENT DOCUMENTS

| | | |
|---|---|---|
| 2017/0230410 A1 | 8/2017 | Hassanzadeh |
| 2020/0244681 A1 | 7/2020 | Klawe et al. |
| 2021/0342347 A1 | 11/2021 | de Abreu Pinho |
| 2024/0154982 A1 | 5/2024 | Maha |

OTHER PUBLICATIONS

"Zero Trust—Revolutionary approach to Cyber or just another buzz word?" Deloitte LLP, 2021 (16 Pages).
Awati, Rahul, et al., "certificate revocation list (CRL)" TechTarget, Web Page <https://www.techtarget.com/searchsecurity/definition/Certificate-Revocation-List> accessed on Nov. 22, 2022 (9 Pages).

*Primary Examiner* — Christopher J Brown
(74) *Attorney, Agent, or Firm* — WOMBLE BOND DICKINSON (US) LLP (57) ABSTRACT

Methods and systems for authenticating data processing systems throughout a distributed environment without user intervention are disclosed. To authenticate data processing systems without user intervention, a system may include a network core and one or more data processing systems. A previously established root of trust between the network core and a data processing system may be lost and the network core may attempt to re-authenticate the data processing system using historical telemetry data. The historical telemetry data may be previously provided to the network core by the data processing system prior to the loss of the root of trust. The network core may provide the data processing system with a security questionnaire based on the telemetry data and the data processing system may use similar telemetry data to respond to the security questionnaire. If the answers to the security questions are considered accurate, the data processing system may be re-authenticated.

20 Claims, 7 Drawing Sheets

Security Risk Level 400:
3

Security Risk Levels 402:
1-2: Low Risk
3-4: Medium Risk
5: High Risk

Security Questionnaire 404

1. Provide timestamp of last upgrade.
2. Provide the lowest measurement obtained last week
3. Provide duration of connection to the network core prior to disconnect

FIG. 4A

Response 406

1. 2022-03-20 03:02:08

2. 25.6 °C 3. 25 days, 3 hours, 10 seconds

Accepted Answers 408

1. 2022-03-20 03:02:08

2. 25.6 °C 3. 25 days, 3 hours, 10 seconds

Status 410:

Authentic

SYSTEM AND METHOD FOR DEVICE AUTHENTICATION IN A DISTRIBUTED ENVIRONMENT WITHOUT USER INTERVENTION

FIELD

Embodiments disclosed herein relate generally to device authentication. More particularly, embodiments disclosed herein relate to systems and methods to reduce computing resource expenditure while performing device authentication throughout a distributed environment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for authentication of data processing systems throughout a distributed environment without user intervention. To authenticate data processing systems throughout a distributed environment without user intervention, the system may include a network core. The network core may initially establish a root of trust with the data processing systems of the distributed environment via user intervention (a user, for example, entering a password, pin, fingerprint scan, etc.). Once the root of trust is established, a secure communication channel may be opened between the network core and the data processing systems.

However, the root of trust may become lost due to, for example, a duration of time passing, a password change, a cryptographic key change, etc. Re-establishing the root of trust with the data processing systems (e.g., throughout an environment that may be highly distributed with a large number of data processing systems) may be a computationally expensive and time-consuming process. This process may require, for example, a user to re-enter a password, answer security questions, physically re-locate one or more data processing systems, and/or may require other means of user intervention.

To conserve computing resources and efficiently re-establish the root of trust with data processing systems throughout a distributed environment, the system may utilize shared knowledge regarding historical telemetry data of the data processing systems to re-establish the root of trust without user intervention. To do so, the system may continuously collect and store telemetry data of data processing systems following establishment of the root of trust. Therefore, in the event of dissolution of the root of trust, the system may use the telemetry data to generate a security questionnaire based on shared historical knowledge. The system may provide the security questionnaire to the data processing systems and receive a response including answers to each security question in the security questionnaire. If the answers match (at least substantially) pre-determined acceptable answers to the security questions, the network core may recognize the data processing systems as authentic. Once the data processing systems are recognized as authentic, the root of trust may be re-established and secure communications may resume.

Thus, embodiments disclosed herein may provide an improved system for authenticating data processing systems throughout a distributed environment. By doing so, authentication of devices may be re-established following dissolution of a root of trust without intervention from a user and using pre-existing shared knowledge already stored by the data processing system for other purposes. Consequently, the root of trust may be efficiently re-established as needed throughout a distributed environment while conserving computing resources and without the intervention by a user.

In an embodiment, a method of authenticating a data processing system by a network core throughout a distributed environment is provided. The method may include: identifying an occurrence of an event indicating that the data processing system is to be authenticated; based on the occurrence of the event: obtaining a security questionnaire using a first activity log based on historic activities performed by the data processing system and a security risk level of the data processing system; providing the security questionnaire to the data processing system; obtaining a response from the data processing system, the response comprising answers that are responsive to security questions of the security questionnaire; making a determination regarding whether each answer of the answers matches a pre-determined answer from a set of possible answers; and in an instance of the determination in which each answer of the answers matches the pre-determined answer: concluding that the data processing system is authentic.

The method may also include: prior to identifying the occurrence of the event: establishing a secure connection to the data processing system; obtaining telemetry data from the data processing system; and storing the telemetry data in the first activity log.

Establishing the secure connection to the data processing system may include: establishing a root of trust between the network core and the data processing system via user intervention; while the root of trust is in place, using the root of trust to establish a secure communication channel between the network core and the data processing system, wherein the occurrence of the event places the secure communication channel into a potentially compromised state.

The telemetry data may include at least one selected from a list consisting of: lifecycle data reflecting operation of the data processing system; content of messages transmitted from the data processing system to the network core; statistics associated with operation of the data processing system; and error event data reflecting a subset of the operation of the data processing system, the subset comprising undesired operation of the data processing system.

The security risk level may indicate a level of threat to the network core associated with a potential security breach of the data processing system.

Obtaining the security questionnaire may include: obtaining a shared knowledge requirement based on the security risk level of the data processing system, the shared knowledge requirement indicating a cardinality and a distribution of the security questions based on the telemetry data; obtaining a portion of the telemetry data from the first activity log based on the shared knowledge requirement; obtaining at least one security question based on the portion of the telemetry data; and populating the security questionnaire with the at least one security question.

Obtaining the security questionnaire may also include: obtaining the pre-determined answer for each answer of the answers based on the portion of the telemetry data and the security questionnaire.

Making the determination may include: obtaining an answer to the at least one security question from the response, the response being based on a second activity log hosted by the data processing system and the second activity log being substantially identical to the first activity log; and comparing the answer to the at least one security question to the pre-determined answer.

The data processing system may be concluded as being authentic without the user intervention, and the method may also include re-establishing the root of trust based on the data processing system being authentic.

The first activity log and the second activity log may be exclusively used for re-establishing a root of trust between the data processing system and the network core after the root of trust is lost due to the occurrence of the event.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Figure 1:
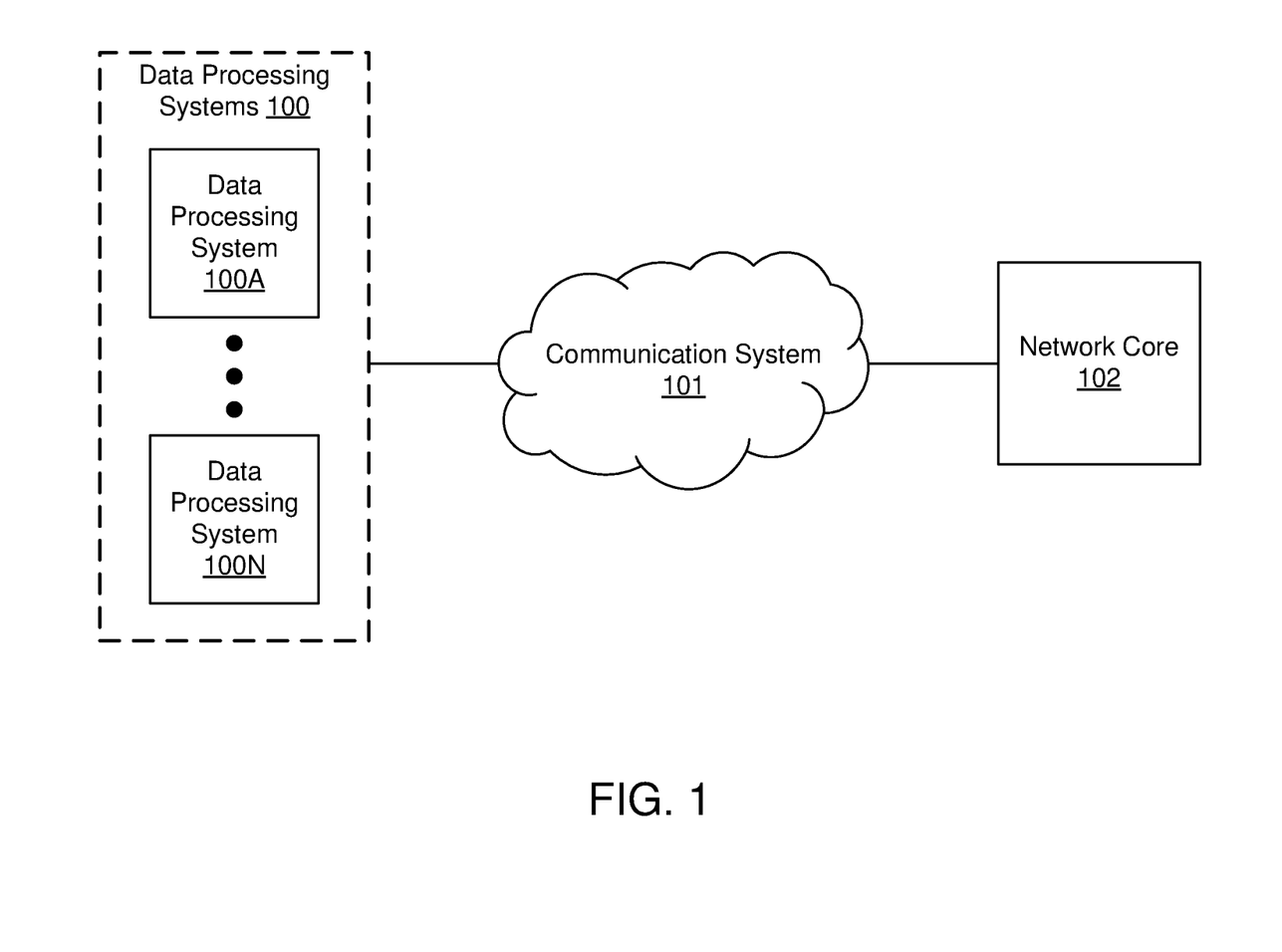
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include monitoring services (e.g., of locations), communication services, and/or any other type of computer-implemented services.

To provide the computer-implemented services, the system may include network core 102. Network core 102 may provide all, or a portion of, the computer-implemented services. For example, network core 102 may provide computer-implemented services to users of network core 102 and/or other computing devices operably connected to network core 102. The computer-implemented services may include any type and quantity of services including, for example, authentication of data processing systems.

To facilitate authentication of data processing systems, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the authentication of data processing systems.

All, or a portion, of data processing systems 100 may provide (and/or participate in and/or support the) computer-implemented services to various computing devices operably connected to data processing systems 100.

The computer-implemented services may include any type and quantity of services including, for example, authentication of data processing systems in a distributed environment. Different data processing systems may provide similar and/or different computer-implemented services.

When providing the computer-implemented services, the system of FIG. 1 may determine whether devices throughout a distributed environment are authenticated prior to exchanging sensitive information. To do so, the system of FIG. 1 may establish a root of trust to each data processing system throughout the distributed environment.

However, roots of trust may be lost and/or otherwise become invalid over time. Re-establishing roots of trust may be a computationally expensive and time-consuming process, as highly distributed environments may include multiple data processing systems that may each individually require re-establishment of roots of trust at different times and/or via different means. Re-establishing a root of trust may require a user to, for example, answer security questions, may require the data processing systems to store additional authentication data, and/or may require other means of intervention by the user. By doing so, undesirable amounts of computing resources may be consumed by the data processing systems and/or the network core (which may each have a limited amount of computing resources available for operation and storage), and delays may occur in operation of the system.

In general, embodiments disclosed herein may provide methods, systems, and/or devices for maintaining authentication of data processing systems throughout a distributed environment without user intervention. To maintain authentication of data processing systems, the system of FIG. 1 may establish an initial root of trust to any number of data processing systems throughout the distributed environment. Following establishment of the root of trust, the data processing systems may provide the network core with telemetry data. Therefore, both the network core and the data processing systems may maintain substantially identical activity logs storing the telemetry data.

In the event of a dissolution of the root of trust, the network core may utilize the telemetry data previously provided by the data processing system to generate a security questionnaire. The security questionnaire may include questions related to past communications, errors, updates, etc. of the data processing systems. The security questionnaire may be provided to the data processing systems and the data processing systems may generate a response including answers to the questions in the security questionnaire using the previously stored telemetry data.

As the data processing systems already store the telemetry data for other purposes (e.g., data backup, system updates, etc.) accessing the telemetry data to answer questions in the questionnaire may not require additional data to be processed or stored by the data processing systems during re-authentication. The data processing systems may provide a response to the network core and the network core may determine whether the answers provided in the response match previously determined accepted answers to the questions. If the answers match the previously determined accepted answers, the data processing systems may be considered authentic. By doing so, data processing systems may be more efficiently re-authenticated following dissolution of a root of trust throughout a distributed environment. As a distributed environment may include many data processing systems and roots of trust may be revoked for various reasons over time, this method of re-establishing trust between the data processing systems and the network core without user intervention provides a timely and computationally efficient solution.

To provide the above noted functionality, the system of FIG. 1 may include network core 102. Network core 102 may (i) identify an occurrence of an event indicating that a data processing system is to be authenticated, (ii) obtain a security questionnaire, (iii) provide the security questionnaire to the data processing system, (iv) obtain a response from the data processing system, (v) determine whether answers in the response match pre-determined answers, and/or (vi) if the answers in the response match the pre-determined answers, conclude that the data processing system is authentic.

The occurrence of the event may include a dissolution of a previously established root of trust. A root of trust may be lost due to, for example, a password change, exposure or change of a cryptographic key, a duration of time passing, etc. Following the event, the data processing system may no longer be trusted, and a secure communication channel may no longer be available.

The security questionnaire may include any number of security questions based on a first activity log hosted by the network core and a security risk level of the data processing system. The first activity log may include telemetry data previously provided to network core 102 by the data processing systems. The security questions may include, for example, questions regarding content of messages, update schedules, lifecycle data of the data processing system, and/or other telemetry data. The type and quantity of the security questions may depend on the security risk level of the data processing system. The security risk level may indicate the potential security risk to the network core in the event of a security breach of the data processing system. Therefore, a data processing system posing a more severe security threat to the network core may be provided with more advanced and/or a higher number of questions in the security questionnaire.

Figure 2:
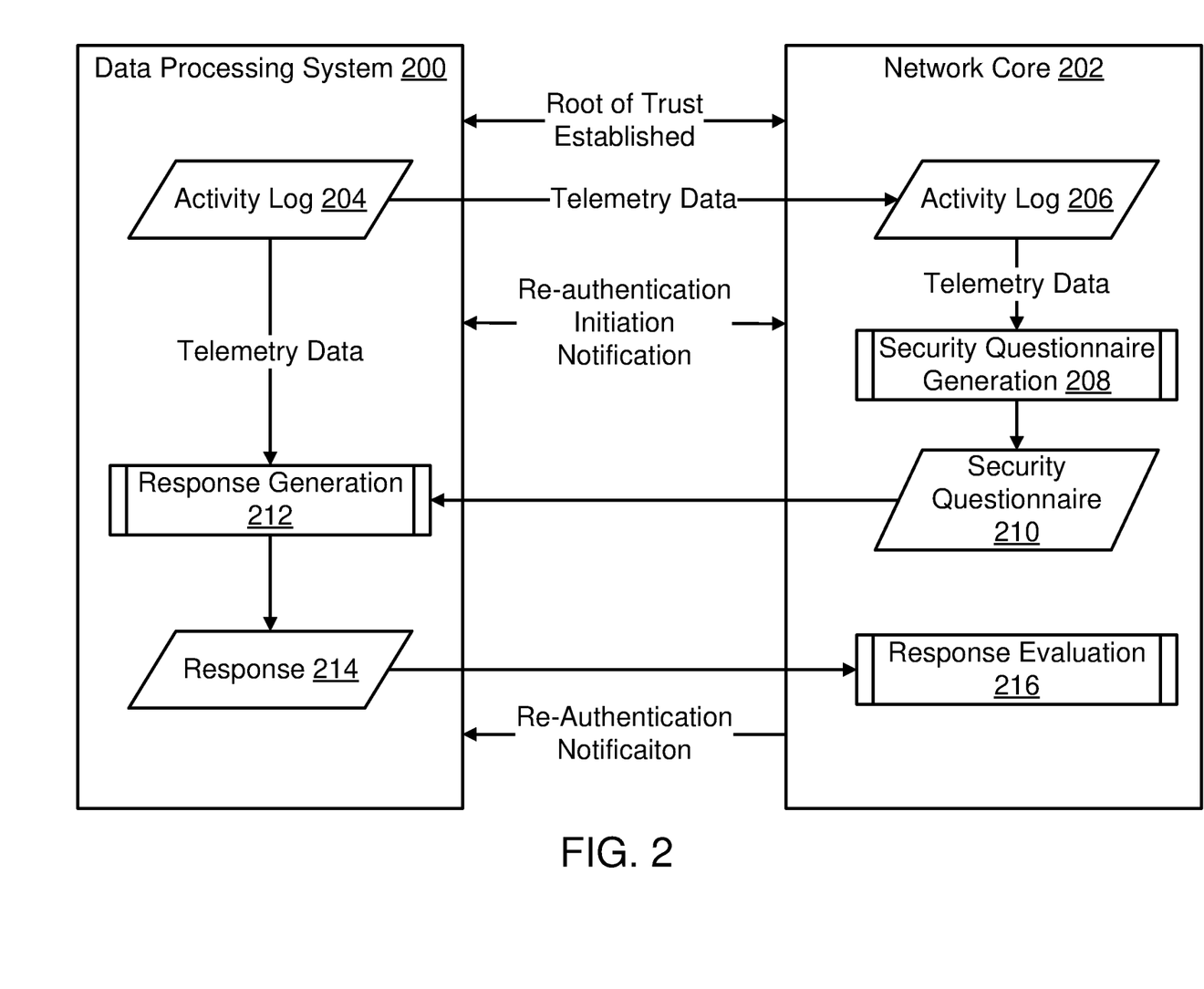
FIG. 2 shows a block diagram illustrating a network core over time in accordance with an embodiment.
Figure 3A:
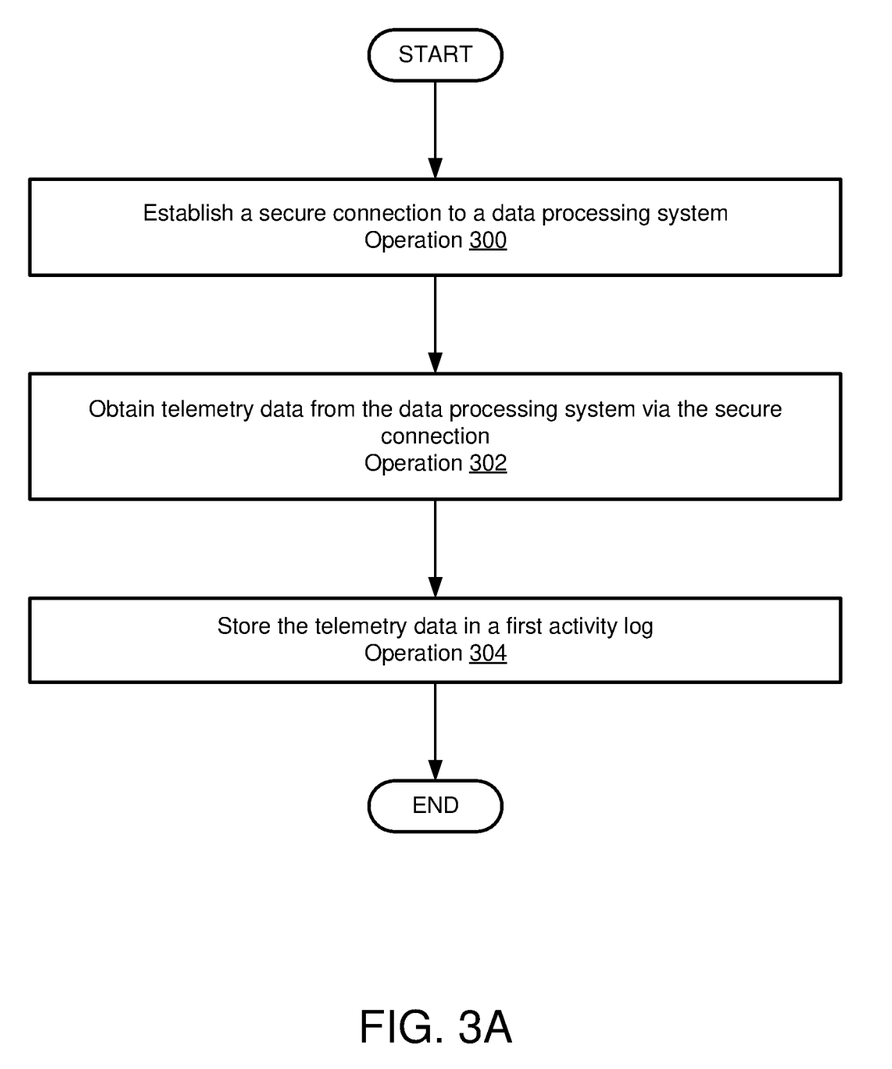
FIG. 3A shows a flow diagram illustrating a method of establishing shared knowledge between a network core and a data processing system in accordance with an embodiment.
Figure 3B:
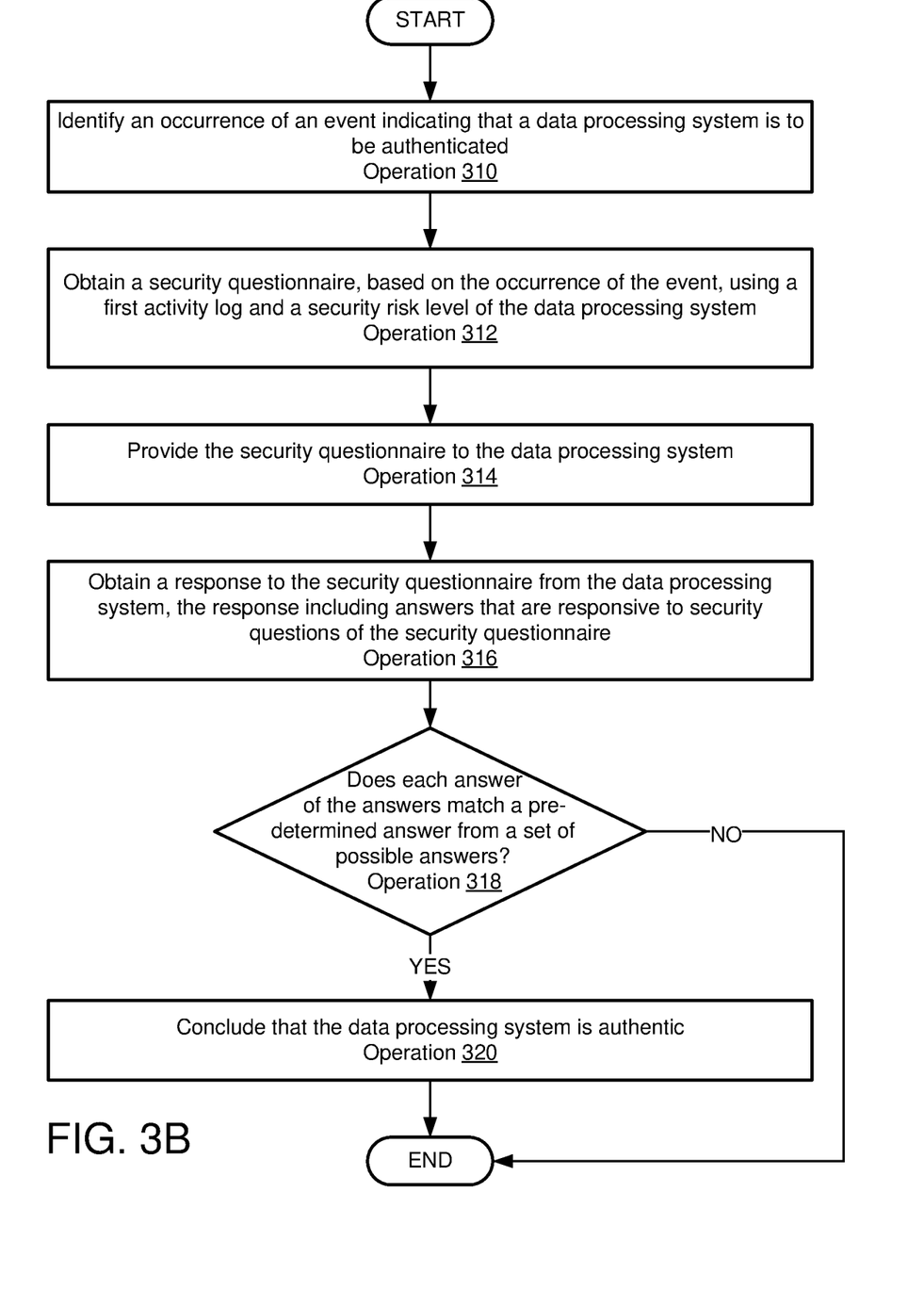
FIG. 3B shows a flow diagram illustrating a method of device authentication without user intervention in accordance with an embodiment.

When performing its functionality, network core 102 and/or data processing systems 100 may perform all, or a portion, of the methods and/or actions shown in FIGS. 2-3B.

Data processing systems 100 and/or network core 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data processing systems 100 and/or network core 102 are implemented using an internet of things (IoT) device, which may include a computing device. The IoT device may operate in accordance with a communication model and/or management model known to network core 102, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows and/or processes performed in a system in accordance with an embodiment are shown in FIG. 2.

FIG. 2 shows a diagram of network core 202 interacting with data processing system 200. Network core 202 may be similar to network core 102 shown in FIG. 1. In FIG. 2, network core 202 may be connected to data processing system 200 via a communication system (not shown). Data processing system 200 may be similar to any of data processing systems 100. Communications between network core 202 and data processing system 200 are illustrated using lines terminating in arrows.

As discussed above, network core 202 may perform computer-implemented services by authenticating devices throughout a distributed environment.

To authenticate devices, network core 202 may establish a root of trust with data processing system 200. The root of trust may indicate that data processing system 200 is authenticated and may exchange secure communications with network core 202. The root of trust may be established via any means including, for example, a user entering a password, pin, biometric factor, etc. Following establishment of the root of trust, data processing system 200 may store telemetry data over time in activity log 204. Telemetry data may include any data related to operation of data processing system 200 that may be useful to monitor and/or assess the performance, security, etc. of the data processing system. For example, telemetry data may include: (i) lifecycle data reflecting operation of the data processing system, (ii) content of messages transmitted from the data processing system to the network core, (iii) statistics associated with the operation of the data processing system, (iv) error event data reflecting a subset of the operation of the data processing system, the subset including undesired operation of the data processing system, and/or other data.

Data processing system 200 may transmit the telemetry data to network core 202 and network core 202 may store the telemetry data in activity log 206. Activity log 206 may be substantially identical to activity log 204 and may store telemetry data and/or other data related to data processing system 200.

The root of trust may be invalidated due to, for example, password changes, cryptographic key exposure, security certificate changes, and/or for other reasons. If the root of trust is lost, network core 202 may transmit a re-authentication initiation notification to data processing system 200. Data processing system 200 may transmit a response (not shown) to establish that data processing system 200 is ready to participate in a re-authentication process.

To re-authenticate data processing system 200 without user intervention, network core 202 may perform security questionnaire generation 208 process. Security questionnaire generation 208 process may include generating security questionnaire 210 using telemetry data from activity log 206 (e.g., based on historic activities performed by data processing system 200) and a security risk level of data processing system 200 (not shown). Activity log 206 and activity log 204 may be exclusively used for re-establishing a root of trust between data processing system 200 and network core 202 after the root of trust is lost. The security risk level may be stored in activity log 206 or may be stored elsewhere and may indicate a level of threat to network core 202 associated with a potential security breach of data processing system 200.

To perform security questionnaire generation 208 process, network core 202 may obtain a shared knowledge requirement (not shown). The shared knowledge requirement may be based on the security risk level and may indicate a cardinality and distribution of security questions to be created based on the telemetry data in activity log 206. Network core 202 may retrieve a portion of the telemetry data from activity log 206 based on the shared knowledge requirement and may populate security questionnaire 210 with a series of security questions based on the portion of the telemetry data. Network core 202 may also generate a set of acceptable answers to the security questions.

Network core 202 may transmit security questionnaire 210 to data processing system 200. Data processing system 200 may perform response generation 212 process using the security questionnaire to generate response 214. Response generation 212 process may include retrieving a portion of the telemetry data from activity log 204 to compile answers the security questions. Response 214 may include answers that are responsive to security questions of security questionnaire 210.

Data processing system 200 may transmit response 214 to network core 202 and network core 202 may perform response evaluation 216 process using the response 214 and the previously established set of acceptable answers (not shown). If the answers in response 214 match the answers in the set of acceptable answers (to a degree considered acceptable by network core 202), data processing system 200 may be concluded to be authentic. If the answers in response 214 do not match the answers in the set of acceptable answers, data processing system 200 may not be concluded to be authentic.

In response to concluding that data processing system 200 is authentic, network core 202 may transmit a re-authentication notification to notify data processing system 200 of successful re-authentication. By re-authenticating data processing system 200 using telemetry data already stored by data processing system 200 and without user intervention, authentication of devices throughout a distributed environment may be timely and computationally efficiently maintained.

In an embodiment, network core 202 is implemented using a processor adapted to execute computing code stored on a persistent storage that when executed by the processor performs the functionality of network core 202 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to perform device authentication in a distributed environment without user intervention. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of establishing shared knowledge between a network core and a data processing system in accordance with an embodiment is shown. The method may be performed, for example, by a network core, data processing system, and/or any other device.

At operation 300, a secure connection is established to a data processing system. The secure connection may be established by: (i) establishing a root of trust between the network core and the data processing system via user intervention, and (ii) while the root of trust is in place, using the root of trust to establish a secure communication channel between the network core and the data processing system.

The root of trust may be established via a user providing an authentication factor (e.g., a password, a pin, a fingerprint, etc.). The user may provide the authentication factor by interacting with a graphical user interface (GUI) on a device (e.g., the data processing system and/or another device throughout the distributed environment). The root of trust may also be established via the user traveling to a particular location with a physical item (e.g., a token, card, etc.). Combinations of authentication factors may be used (e.g., a card and a password) to establish the root of trust. To establish the secure communication channel, the network core may transmit a shared secret (e.g., a secure cryptographic key) to the data processing system via a communication system.

At operation 302, telemetry data is obtained from the data processing system via the secure connection. Telemetry data may be transmitted to the network core by the data processing system via the secure connection continuously, at regular intervals, and/or when requested by the network core. Telemetry data may also be transmitted to another trusted device and the trusted device may provide the telemetry data to the network core.

At operation 304, the telemetry data is stored in a first activity log. The telemetry data may be stored by generating a data structure to act as the first activity log. The telemetry data may also be added to an existing data structure to update the first activity log. The telemetry data may be added to the first activity log as it is received by the network core and/or the telemetry data may undergo some processes (e.g., categorization, analysis, etc.) prior to being added to the first activity log. The telemetry data may also be transmitted (via a secure connection) to another device responsible for storing the telemetry data in the first activity log.

The method may end following operation 304.

Turning to FIG. 3B, a flow diagram illustrating a method of device authentication without user intervention in accordance with an embodiment is shown. The method may be performed, for example, by a network core, data processing system, and/or any other device.

At operation 310, an occurrence of an event indicating that a data processing system is to be authenticated is identified. The occurrence of the event may place the previously established secure communication channel into a potentially compromised state. The occurrence of the event may be identified by: (i) receiving a notification that the secure connection has been lost, and/or (ii) terminating the secure connection. The secure connection may be terminated in response to an identification of: (i) a password change, (ii) exposure of the cryptographic key, (iii) a security certificate time-out, and/or other reasons.

At operation 312, a security questionnaire is obtained, based on the occurrence of the event, using a first activity log and a security risk level of the data processing system. Obtaining the security questionnaire may include: (i) obtaining a shared knowledge requirement based on the security risk level of the data processing system, (ii) obtaining a portion of the telemetry data from the first activity log based on the shared knowledge requirement, (iii) obtaining at least one security question based on the portion of the telemetry data, (iv) populating the security questionnaire with the at least one security question, and (v) obtaining a pre-determined answer for each answer of the answers based on the portion of the telemetry data and the security questionnaire.

Obtaining the shared knowledge requirement may include obtaining the security risk level of the data processing system. The security risk level may be calculated based on telemetry data in the first activity log, specifications (e.g., connectivity to the network core, computing resource availability, device privileges, etc.) related to the data processing system, and/or other statistics. The security risk level may also be obtained from another device responsible for generating and/or storing security risk levels. The shared knowledge requirement may then be generated based on an analysis of the security risk level and the telemetry data available in the first activity log. The shared knowledge requirement may also be requested from another device responsible for generating and/or storing shared knowledge requirements for data processing systems.

The portion of the telemetry data may be obtained by accessing the first activity log. To access the first activity log, a lookup may be performed using a telemetry data lookup table and at least a portion of the shared knowledge requirement as a key for the telemetry data lookup table. The portion of the telemetry data may also be obtained by: (i) transmitting a request for the portion of the telemetry data to a device storing the telemetry data, and/or (ii) obtaining access credentials to a database and using the access credentials to gain access to the first activity log stored in the database.

The at least one security question may be obtained by feeding the portion of the telemetry data into an inference model or rules-based engine trained to form questions based on input data. The at least one security question may also be obtained by transmitting telemetry data to another device responsible for generating security questions and receiving the at least one security question as a response from the device.

The security questionnaire may be populated with the at least one security question by generating a data structure to be treated as the security questionnaire and adding the at least one security question to the data structure. The at least one security question may also be added to an existing security questionnaire and previous security questions may be adapted, deleted, or analyzed to determine continued relevance.

The security questionnaire may be populated with the at least one security question by transmitting the at least one security question to another device responsible for generating the security questionnaire based on security questions.

The pre-determined answer for each answer of the answers may be obtained by feeding the security questionnaire and the portion of the telemetry data into an inference model trained to generate possible acceptable answers to each security question of the security questionnaire. The possible acceptable answers may be added to a (previously generated or newly generated) data structure to be treated as the answers.

At operation 314, the security questionnaire is provided to the data processing system. The security questionnaire may be transmitted to the data processing system over a communication system. The security questionnaire may be transmitted automatically when the security questionnaire is generated, may be transmitted upon receipt of a notification that the data processing system is ready to receive the security questionnaire and/or may be transmitted based on any other schedule. The security questionnaire may be provided to the data processing system by sending a notification to another device storing the security questionnaire to transmit the security questionnaire to the data processing system.

At operation 316, a response to the security questionnaire is obtained from the data processing system, the response including answers that are responsive to security questions of the security questionnaire. The response may be obtained via a message transmitted by the data processing system over the communication system. Obtaining the response may include decrypting the response using a previously shared cryptographic key, by generating a hash of the pre-determined answer to compare to a hash included in the response, and/or other security measures.

At operation 318, it is determined whether each answer of the answers matches a pre-determined answer from a set of possible answers. If each answer of the answers matches the pre-determined answer from the set of possible answers, the method may proceed to operation 320. If each answer of the answers does not match the pre-determined answer from the set of possible answers, the method may end following operation 318.

Whether each answer of the answers matches a pre-determined answer from a set of possible answers may be determined by: (i) obtaining a first answer from the response, the first answer corresponding to a first security question of the at least one security questions, (ii) determining whether the first answer matches a corresponding pre-determined answer from the set of possible answers, and (iii) if the first answer matches the corresponding pre-determined answer, treating the first answer as accurate.

Obtaining the first answer from the response may include parsing the response into answers to each security question and selecting one of the answers to one of the security questions as the first answer. The first answer may be selected at random, may be selected by selecting the first question in the security questionnaire, and/or may be selected via another selection methodology. The response may also be transmitted to another device responsible for selecting the first answer.

To determine whether the first answer matches the pre-determined answer from the set of possible answers, the pre-determined answer may be obtained. The pre-determined answer (or answers) corresponding to the security question may be selected from the set of possible answers, and the first answer may be compared to the pre-determined answer or answers. If the first answer matches the pre-determined answers (at least substantially or to an extent determined acceptable), the first answer may be considered accurate.

The above-described process may be repeated for each answer included in the response until all answers included in the response have been determined to be accurate or inaccurate.

At operation 320, the data processing system is concluded to be authentic. The data processing system may be concluded to be authentic without the user intervention. Concluding the data processing system to be authentic may include evaluating the accuracy of answers in the response to determine whether the response is accurate enough to consider the data processing system to be authentic. Evaluating the accuracy of the answers in the response may include comparing the number of correct answers to a previously determined amount of acceptable correct answers. Evaluating the accuracy of the answers may be performed via other means, such as comparing a percent accuracy to an acceptable percentage of accuracy, etc. If the answers in the response are considered acceptably accurate, the data processing system may be concluded to be authentic, and the root of trust may be re-established without user intervention. Re-establishing the root of trust may include establishing a new secure communications channel to the data processing system and distributing a new cryptographic key to the data processing system.

The method may end following operation 320.

Figure 4A:
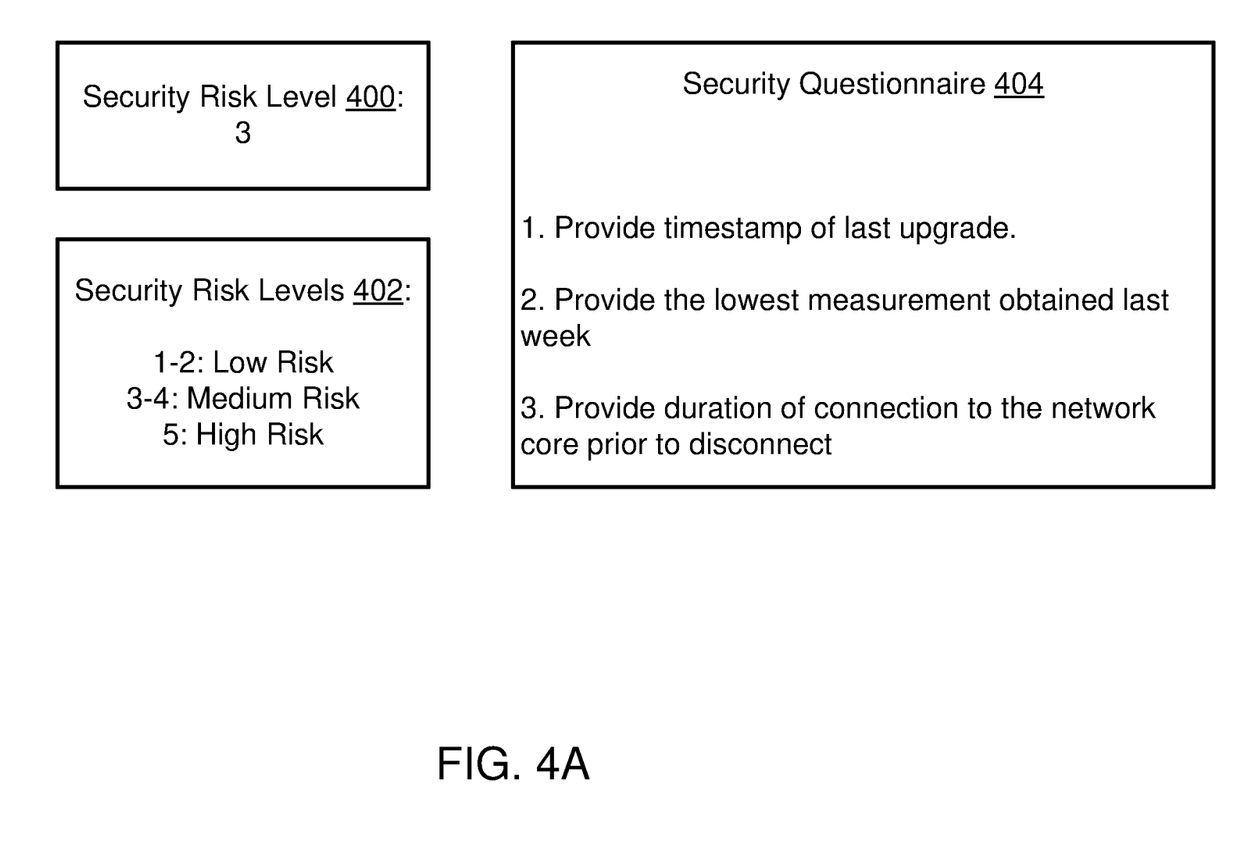
FIGS. 4A-4B show block diagrams illustrating a system in accordance with an embodiment over time.

Turning to FIG. 4A, consider a scenario in which a root of trust is lost between a data processing system and a network core. To re-establish the root of trust, the network core may generate a security questionnaire based on historical telemetry data previously obtained from the data processing system (not shown) and security risk level 400 of the data processing system. Security risk level 400 may indicate that the security risk level of the data processing system is 3. Security risk levels 402 may indicate the relative amount of risk associated with different security risk levels. For example, a data processing with a corresponding security risk level of 3-4 is considered as having medium risk to the network core if compromised.

The security risk level of 3 may trigger generation of a security questionnaire including three questions related to three different types of telemetry data. Security questionnaire 404 may include these three questions. A first question may be related to historical timelines of past upgrades downloaded by the data processing system. As shown in FIG. 4A, the first question may request a timestamp of a most recent upgrade by the data processing system. A second question may be related to historical data collected by the data processing system. As shown in FIG. 4A, the second question may request the lowest measurement obtained by the data processing system the previous week. A third question may be related to the connectivity of the data processing system over time. As shown in FIG. 4A, the third question may request the duration of time the data processing system was connected to the network core prior to losing connectivity. Security questionnaire 404 may be transmitted to the data processing system (not shown).

Figure 4B:
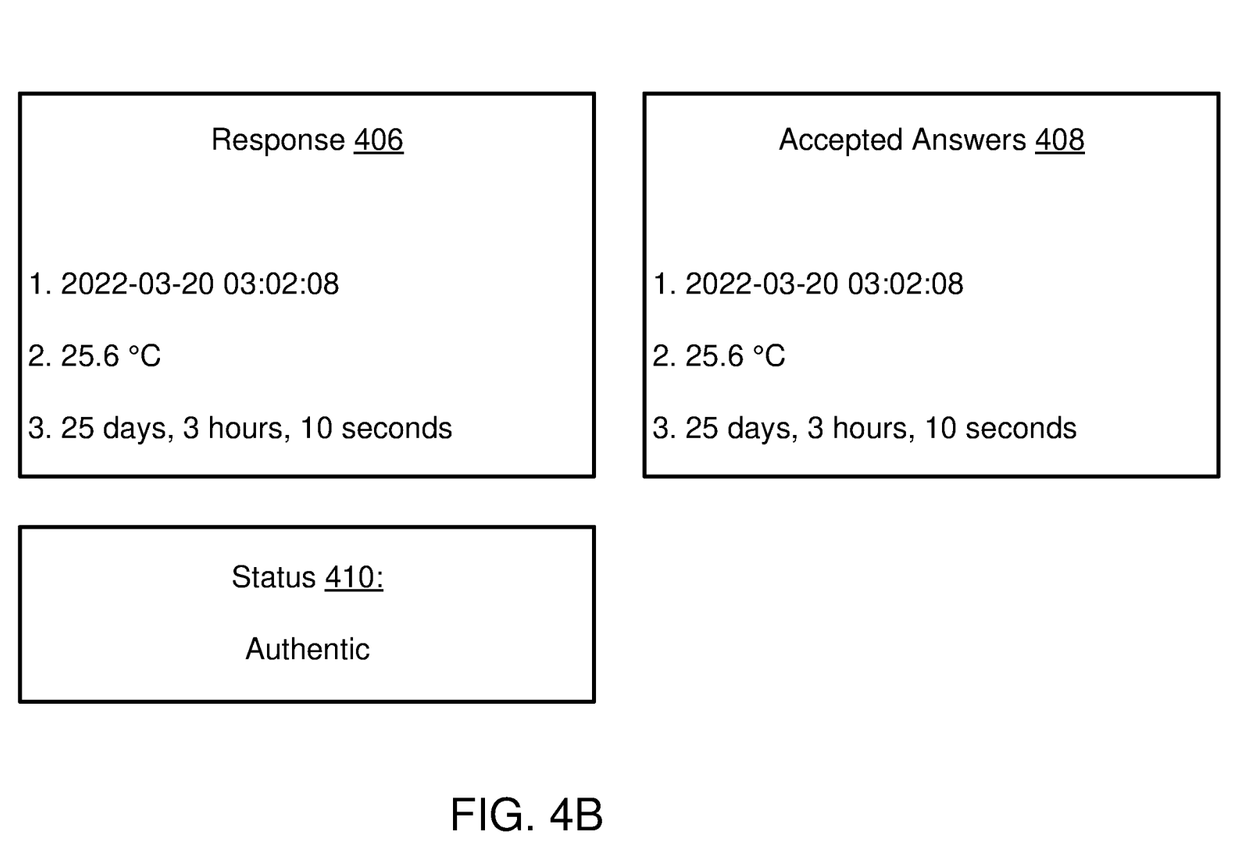

Turning to FIG. 4B, response 406 may be received from the data processing system following transmission of security questionnaire 404 to the data processing system. Response 406 may include answers to the security questions included in security questionnaire 404. The answers in response 406 may be generated by the data processing system without user intervention based on an activity log matching an activity log hosted by the network core.

Accepted answers 408 may be generated by the network core and may include responses to the security questions that are considered accurate. The answers of accepted answers 408 may be generated using security questionnaire 404 and the telemetry data. The network core may compare the answers in response 406 to the answers in accepted answers 408 to determine whether the data processing system is authentic. In this scenario, the answers of response 406 may match the answers of accepted answers 408 and the data processing system may be assigned status 410 of authentic. As a result, the root of trust may be re-established with the data processing system and secure communications may resume between the network core and the data processing system.

Figure 5:
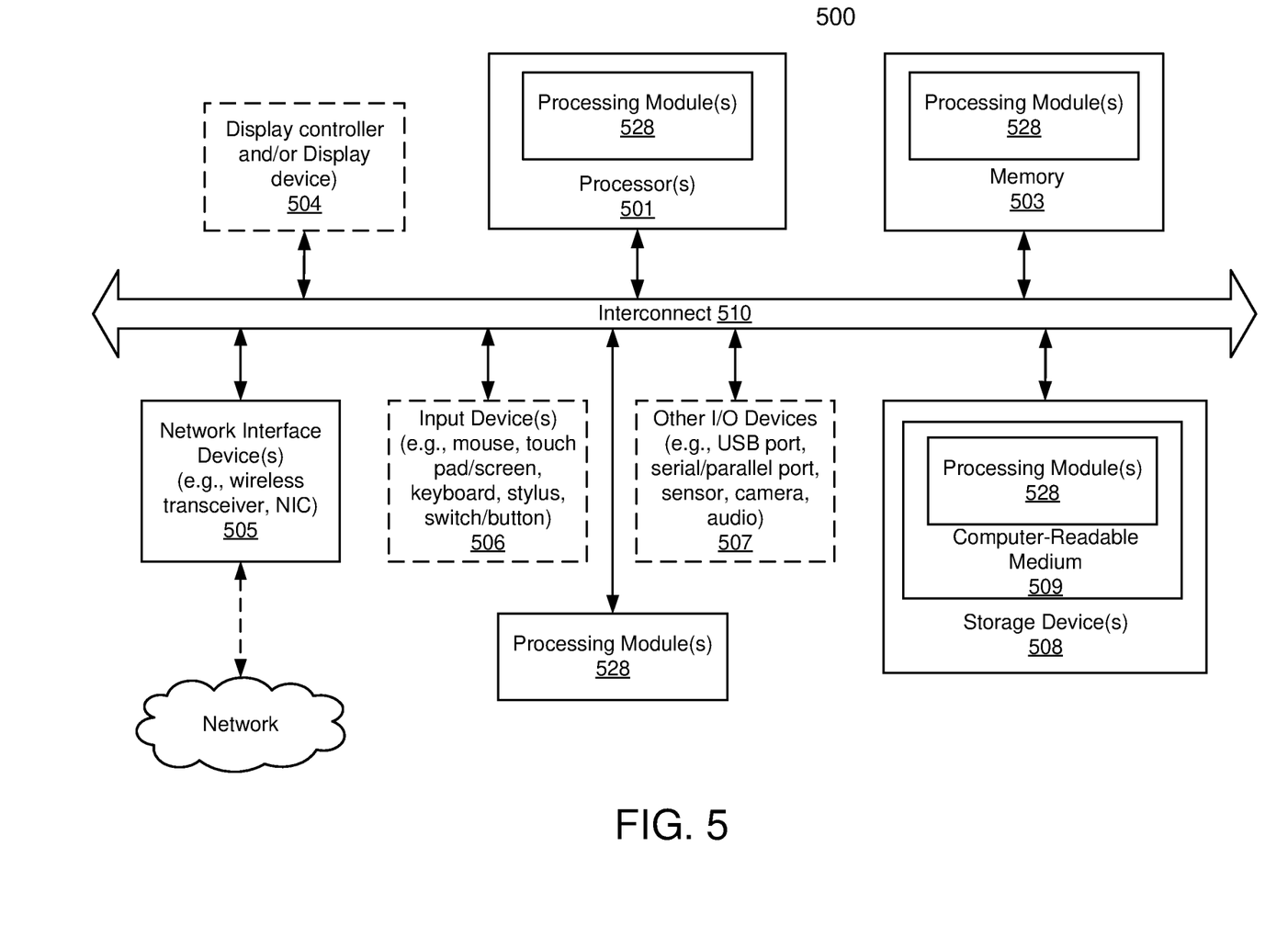
FIG. 5 shows a block diagram illustrating a data processing system in accordance with an embodiment.

Any of the components illustrated in FIGS. 1-4B may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS R/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of authenticating a data processing system by a network core throughout a distributed environment, the method comprising:
   identifying an occurrence of an event indicating that the data processing system is to be authenticated;
   based on the occurrence of the event:
      obtaining a security questionnaire using a first activity log based on historic activities performed by the data processing system and a security risk level of the data processing system;
      providing the security questionnaire to the data processing system;
      obtaining a response from the data processing system, the response comprising answers that are responsive to security questions of the security questionnaire without user intervention;
      making a determination regarding whether each answer of the answers matches a pre-determined answer from a set of possible answers; and
      in an instance of the determination in which each answer of the answers matches the pre-determined answer:
         concluding that the data processing system is authentic.

2. The method of claim 1, further comprising:
   prior to identifying the occurrence of the event:
      establishing a secure connection to the data processing system;
      obtaining telemetry data from the data processing system; and
      storing the telemetry data in the first activity log.

3. The method of claim 2, wherein establishing the secure connection to the data processing system comprises:
   establishing a root of trust between the network core and the data processing system via user intervention;
   while the root of trust is in place, using the root of trust to establish a secure communication channel between the network core and the data processing system,
   wherein the occurrence of the event places the secure communication channel into a potentially compromised state.

4. The method of claim 2, wherein the telemetry data comprises at least one selected from a list consisting of:
   lifecycle data reflecting operation of the data processing system;
   content of messages transmitted from the data processing system to the network core;
   statistics associated with operation of the data processing system; and
   error event data reflecting a subset of the operation of the data processing system, the subset comprising undesired operation of the data processing system.

5. The method of claim 2, wherein the security risk level indicates a level of threat to the network core associated with a potential security breach of the data processing system.

6. The method of claim 3, wherein obtaining the security questionnaire comprises:

obtaining a shared knowledge requirement based on the security risk level of the data processing system, the shared knowledge requirement indicating a cardinality and a distribution of the security questions based on the telemetry data;

obtaining a portion of the telemetry data from the first activity log based on the shared knowledge requirement;

obtaining at least one security question based on the portion of the telemetry data; and populating the security questionnaire with the at least one security question.

7. The method of claim 6, wherein obtaining the security questionnaire further comprises:

obtaining the pre-determined answer for each answer of the answers based on the portion of the telemetry data and the security questionnaire.

8. The method of claim 7, wherein making the determination comprises:

obtaining an answer to the at least one security question from the response, the response being based on a second activity log hosted by the data processing system and the second activity log being substantially identical to the first activity log; and comparing the answer to the at least one security question to the pre-determined answer.

9. The method of claim 3, wherein the data processing system is concluded as being authentic without the user intervention, and wherein the method further comprises:

re-establishing the root of trust based on the data processing system being authentic.

10. The method of claim 8, wherein the first activity log and the second activity log are exclusively used for re-establishing a root of trust between the data processing system and the network core after the root of trust is lost due to the occurrence of the event.

11. A non-transitory machine-readable medium having instructions stored therein, which when executed by a processor, cause the processor to perform operations for authenticating a data processing system by a network core throughout a distributed environment, the operations comprising:

identifying an occurrence of an event indicating that the data processing system is to be authenticated;

based on the occurrence of the event:

obtaining a security questionnaire using a first activity log based on historic activities performed by the data processing system and a security risk level of the data processing system;

providing the security questionnaire to the data processing system;

obtaining a response from the data processing system, the response comprising answers that are responsive to security questions of the security questionnaire without user intervention;

making a determination regarding whether each answer of the answers matches a pre-determined answer from a set of possible answers; and in an instance of the determination in which each answer of the answers matches the pre-determined answer:

concluding that the data processing system is authentic.

12. The non-transitory machine-readable medium of claim 11, further comprising:

prior to identifying the occurrence of the event:

establishing a secure connection to the data processing system;

obtaining telemetry data from the data processing system; and storing the telemetry data in the first activity log.

13. The non-transitory machine-readable medium of claim 12, wherein establishing the secure connection to the data processing system comprises:

establishing a root of trust between the network core and the data processing system via user intervention;

while the root of trust is in place, using the root of trust to establish a secure communication channel between the network core and the data processing system, wherein the occurrence of the event places the secure communication channel into a potentially compromised state.

14. The non-transitory machine-readable medium of claim 12, wherein the telemetry data comprises at least one selected from a list consisting of:

lifecycle data reflecting operation of the data processing system;

content of messages transmitted from the data processing system to the network core;

statistics associated with operation of the data processing system; and error event data reflecting a subset of the operation of the data processing system, the subset comprising undesired operation of the data processing system.

15. The non-transitory machine-readable medium of claim 12, wherein the security risk level indicates a level of threat to the network core associated with a potential security breach of the data processing system.

16. A data processing system, comprising:

a processor; and a memory coupled to the processor to store instructions, which when executed by the processor, cause the processor to perform operations for authenticating a data processing system by a network core throughout a distributed environment, the operations comprising:

identifying an occurrence of an event indicating that the data processing system is to be authenticated;

based on the occurrence of the event:

obtaining a security questionnaire using a first activity log based on historic activities performed by the data processing system and a security risk level of the data processing system without user intervention;

providing the security questionnaire to the data processing system;

obtaining a response from the data processing system, the response comprising answers that are responsive to security questions of the security questionnaire;

making a determination regarding whether each answer of the answers matches a pre-determined answer from a set of possible answers; and in an instance of the determination in which each answer of the answers matches the pre-determined answer:

concluding that the data processing system is authentic.

17. The data processing system of claim 16, further comprising:

prior to identifying the occurrence of the event:

establishing a secure connection to the data processing system;

obtaining telemetry data from the data processing system; and storing the telemetry data in the first activity log.

18. The data processing system of claim 17, wherein establishing the secure connection to the data processing system comprises:
- establishing a root of trust between the network core and the data processing system via user intervention;
- while the root of trust is in place, using the root of trust to establish a secure communication channel between the network core and the data processing system,
- wherein the occurrence of the event places the secure communication channel into a potentially compromised state.

19. The data processing system of claim 17, wherein the telemetry data comprises at least one selected from a list consisting of:
- lifecycle data reflecting operation of the data processing system;
- content of messages transmitted from the data processing system to the network core;
- statistics associated with operation of the data processing system; and
- error event data reflecting a subset of the operation of the data processing system, the subset comprising undesired operation of the data processing system.

20. The data processing system of claim 17, wherein the security risk level indicates a level of threat to the network core associated with a potential security breach of the data processing system.

* * * * *